(12) United States Patent
Mizobe (10) Patent No.: US 11,919,660 B2
(45) Date of Patent: *Mar. 5, 2024

(54) LED FLASH LIGHT SOURCE AND RUNWAY-EMBEDDED FLASH LIGHTING DEVICE

(71) Applicant: HotaluX, Ltd., Tokyo (JP)

(72) Inventor: Norimasa Mizobe, Tokyo (JP)

(73) Assignee: HotaluX, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/863,040

(22) Filed: Jul. 12, 2022

(65) Prior Publication Data

US 2023/0002078 A1 Jan. 5, 2023

Related U.S. Application Data

(63) Continuation of application No. 17/287,606, filed as application No. PCT/JP2019/032555 on Aug. 21, 2019, now Pat. No. 11,420,768.

(30) Foreign Application Priority Data

Oct. 26, 2018 (JP) ................................ 2018-201401

(51) Int. Cl.
  *B64F 1/20* (2006.01)
  *F21S 8/02* (2006.01)
  (Continued)

(52) U.S. Cl.
  CPC .............. *B64F 1/205* (2013.01); *F21S 8/022* (2013.01); *F21S 10/06* (2013.01); *F21V 5/007* (2013.01);
  (Continued)

(58) Field of Classification Search
  CPC ...... B64D 2203/00; B64F 1/205; F21S 8/022; F21S 10/06; F21V 5/007; F21V 5/02;
  (Continued)

(56) References Cited

U.S. PATENT DOCUMENTS 3,113,726 A 12/1963 Pennow et al.
3,200,243 A 8/1965 McDevitt et al.
(Continued)

FOREIGN PATENT DOCUMENTS

CA 3 003 702 A1 5/2017
CN 101761840 A 6/2010
(Continued)

OTHER PUBLICATIONS

Office Action dated Dec. 23, 2022 in Canadian Application No. 3,110,305.

(Continued)

*Primary Examiner* — Jason M Han
(74) *Attorney, Agent, or Firm* — Sughrue Mion, PLLC (57) ABSTRACT

A runway-embedded flash lighting device includes, a body configured for embedding in a runway, a ceiling member with a flash emission window, a bottom cover member, a light guide member disposed in the flash emission window, and two or more flash emission windows. The light guide member is disposed in each of the flash emission windows and an inner surface of the ceiling member is provided with a site to be disposed with a LED flash light source below the flash emission window. The LED flash light source includes, an LED module, a frame-shaped attaching plate; and a lens member. The lens member is attached to a hollow portion in a frame of the frame-shaped attaching plate, and is configured to allow an emission surface of the flash emitted from the LED module to have a uniform illuminance distribution.

10 Claims, 11 Drawing Sheets

(51) Int. Cl.
*F21S 10/06* (2006.01)
*F21V 5/00* (2018.01)
*F21V 5/02* (2006.01)
*F21V 15/01* (2006.01)
*F21V 15/04* (2006.01)
*F21V 29/70* (2015.01)
*F21W 111/06* (2006.01)
*F21Y 115/10* (2016.01)

(52) U.S. Cl.
CPC ............... *F21V 5/02* (2013.01); *F21V 15/01* (2013.01); *F21V 15/04* (2013.01); *F21V 29/70* (2015.01); *B64D 2203/00* (2013.01); *F21W 2111/06* (2013.01); *F21Y 2115/10* (2016.08)

(58) Field of Classification Search
CPC .......... F21V 15/01; F21V 15/04; F21V 29/70; F21W 2111/06; F21Y 2115/10
See application file for complete search history.

(56) References Cited

U.S. PATENT DOCUMENTS

| | | | |
|---|---|---|---|
| 3,369,114 | A | 2/1968 | Carter |
| 3,624,379 | A | 11/1971 | Bliss et al. |
| 4,112,485 | A | 9/1978 | Sutter |
| 4,860,182 | A | 8/1989 | Vadseth |
| 5,676,448 | A | 10/1997 | Urbaing |
| 5,703,719 | A | 12/1997 | Chen |
| 6,354,714 | B1 | 3/2002 | Rhodes |
| 6,669,351 | B1 | 12/2003 | Shea et al. |
| 2003/0048634 | A1 | 3/2003 | You et al. |
| 2008/0007430 | A1 | 1/2008 | Wang et al. |
| 2010/0053946 | A1 | 3/2010 | Laenen et al. |
| 2010/0277901 | A1 | 11/2010 | Farchtchian et al. |
| 2011/0121734 | A1 | 5/2011 | Pape |
| 2012/0218742 | A1 | 8/2012 | Beukema et al. |
| 2013/0170205 | A1 | 7/2013 | Abel et al. |
| 2016/0281965 | A1 | 9/2016 | Schneider et al. |
| 2016/0327258 | A1 | 11/2016 | Sloan |
| 2017/0211247 | A1 | 7/2017 | Messiou et al. |
| 2017/0299160 | A1 | 10/2017 | Salazar et al. |
| 2018/0328550 | A1 | 11/2018 | Mizobe |
| 2021/0394926 | A1 | 12/2021 | Mizobe |
| 2021/0394927 | A1 | 12/2021 | Mizobe |
| 2021/0394928 | A1 | 12/2021 | Mizobe |

FOREIGN PATENT DOCUMENTS

| | | |
|---|---|---|
| CN | 102537772 A | 7/2012 |
| CN | 202501314 U | 10/2012 |
| DE | 20 2009 009 583 U1 | 9/2009 |
| JP | 2000-228103 A | 8/2000 |
| JP | 2012-204205 A | 10/2012 |
| JP | 2016-026929 A | 2/2016 |
| JP | 2016-195072 A | 11/2016 |
| JP | 2017-054675 A | 3/2017 |
| KR | 10-0952375 B1 | 4/2010 |
| WO | 2009/077010 A1 | 6/2009 |
| WO | 2017/001158 A1 | 1/2017 |
| WO | 2017/081999 A1 | 5/2017 |

OTHER PUBLICATIONS

Office Action issued in the related (U.S. Appl. No. 17/859,652) dated Nov. 10, 2022.
Office Action issued in the related (U.S. Appl. No. 17/833,955) dated Oct. 11, 2022.
Office Action issued in the corresponding Japanese patent application (No. 2020-516778) dated Nov. 8, 2022.
Office Action issued in the related Japanese patent application (No. 2020-516779) dated Nov. 15, 2022.
Office Action issued in the related Japanese patent application (No. 2020-516781) dated Nov. 22, 2022.
International Search Report for PCT/JP2019/032555 dated Oct. 21, 2019 [PCT/ISA/210].
International Search Report for PCT/JP2019/032554 dated Oct. 15, 2019.
International Search Report for PCT/JP2019/032556 dated Oct. 21, 2019.
Australian Examination Report dated Nov. 15, 2021 in Australian Patent Application No. 2019367751.
Office Action dated Dec. 7, 2021 in U.S. Appl. No. 17/287,609.
Office Action dated Nov. 19, 2021 in U.S. Appl. No. 17/287,608.
Office Action dated Dec. 3, 2021 in U.S. Appl. No. 17/287,604.
Examination Report dated Mar. 30, 2022 in Australian Application No. 2019367751.
Examination Report dated Mar. 8, 2022 in Australian Application No. 2019365599.
Office Action dated Mar. 18, 2022 in U.S. Appl. No. 17/287,609.
International Search Report for PCT/JP2019/032558 dated Oct. 15, 2019.
Extended European Search Report dated Jun. 3, 2022 in European Application No. 19877393.9.
Extended European Search Report dated Jun. 1, 2022 in European Application No. 19876239.5.
Extended European Search Report dated Jun. 1, 2022 in European Application No. 19875490.5.
Notice of Allowance dated Jul. 5, 2023 in the related U.S. Appl. No. 17/964,666.
European Office Action dated Sep. 15, 2023 in EP Application No. 19876239.5.

LED FLASH LIGHT SOURCE AND RUNWAY-EMBEDDED FLASH LIGHTING DEVICE

CROSS REFERENCE TO RELATED APPLICATIONS

This application is a Continuation Application of U.S. application Ser. No. 17/287,606 filed Apr. 22, 2022, which is a National Stage of International Application No. PCT/JP2019/032555 filed Aug. 21, 2019, claiming priority based on Japanese Patent Application No. 2018-201401 filed Oct. 26, 2018.

TECHNICAL FIELD

The present invention relates to an LED flash light source and a runway-embedded flash lighting device.

BACKGROUND ART

Conventionally, marker lamps for emitting marker light have been embedded under an airfield runway as a guide sign (for example, see Patent Literature 1). In the marker lamp embedded under an airfield runway, a discharge lamp containing xenon is sometimes used as a flash light source.

CITATION LIST

Patent Literature

Patent Literature 1: JP 2000-228103 A

SUMMARY OF INVENTION

Technical Problem

However, a flash lighting device using a xenon flash light source is heavy, has a short life, has a low effective luminous intensity, cannot switch the luminous intensity among high luminous intensity, medium luminous intensity, and low luminous intensity, and consumes a large amount of power. In addition, in the runway-embedded flash lighting device, the flash light source may be damaged by the impact of aircraft-landing.

With the foregoing in mind, it is an object of the present invention to provide a new flash light source for a runway-embedded flash lighting device that is light, has a long life, has high effective luminous intensity, can switch the luminous intensity, is low in power dissipation, and is excellent in impact resistance.

Solution to Problem

In order to achieve the above object, according to one aspect of the present invention there is provided an LED flash light source for a runway-embedded flash lighting device including: an LED module; a frame-shaped attaching plate; a lens member; and a shock-absorbing sheet, wherein the lens member is attached to a hollow portion in s frame of the frame-shaped attaching plate, the lens member is a lens member that allows an emission surface of flash emitted from the LED to have a uniform illuminance distribution, the shock-absorbing sheet includes: a lower shock-absorbing sheet; and an upper shock-absorbing sheet, the lower shock-absorbing sheet is placed on the LED module, the frame-shaped attaching plate to which the lens member is attached is placed on the lower shock-absorbing sheet, and the upper shock-absorbing sheet is placed on the frame-shaped attaching plate.

Advantageous Effects of Invention

The LED flash light source for a runway-embedded flash lighting device of the present invention is light, has a long life, has high effective luminous intensity, can switch the luminous intensity, is low in power dissipation, and is excellent in impact resistance.

DESCRIPTION OF EMBODIMENTS

Next, example embodiments of the present invention will be described with reference to FIGS. 1 to 11. The present invention, however, is not limited or restricted to the following example embodiments by any means. In FIGS. 1 to 11, identical parts are indicated with identical reference signs. Regarding the descriptions of the example embodiments, reference can be made to one another. Furthermore, in the drawings, for ease of description, illustration of the structures of the components may be appropriately simplified, and the size, the ratio, and the like of components may be schematically shown and different from actual ones.

First Example Embodiment

Figure 1A:
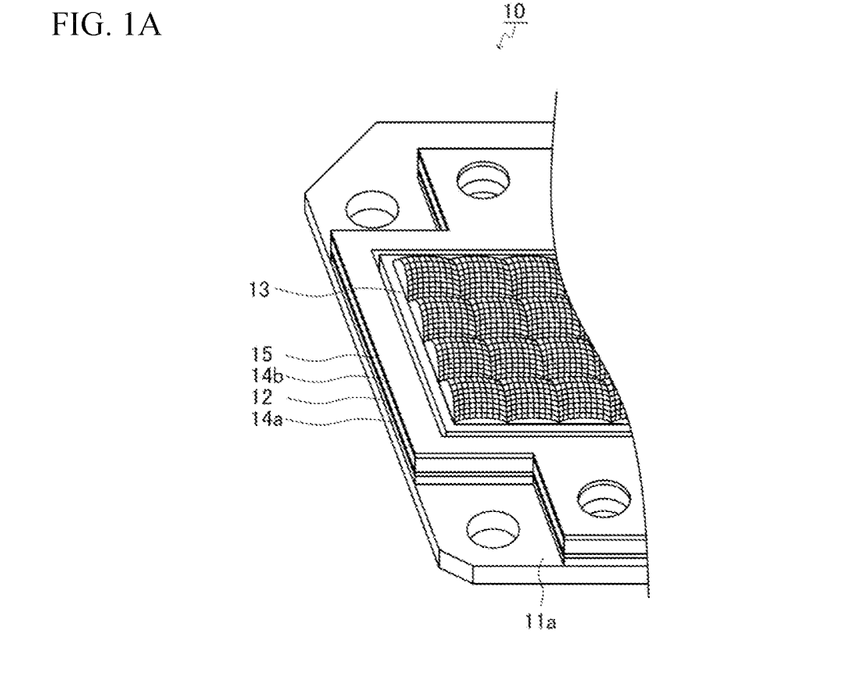
FIG. 1A is a partially enlarged perspective view showing an example of the LED flash light source for a runway-embedded flash lighting device according to the first embodiment.
Figure 1B:
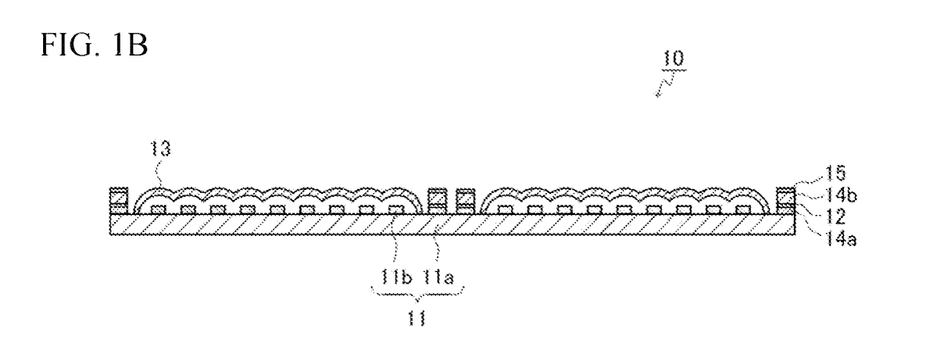
FIG. 1B is a schematic side view of the LED flash light source shown in FIG. 1A.

FIG. 1A is a partially enlarged perspective view showing the configuration of an example of an LED flash light source for a runway-embedded flash lighting device according to the present embodiment. FIG. 1B is a schematic side view of the LED flash light source shown in FIG. 1A. In FIG. 1B, a frame-shaped attaching plate 12 to be described below, a shock-absorbing sheet, and the hollow portion in the frame of a frame-shaped holding plate 15 are shown perspectively. As shown in FIGS. 1A and 1B, an LED flash light source 10 includes an LED module 11, the frame-shaped attaching plate 12, a lens member 13, and the shock-absorbing sheet. The shock-absorbing sheet will be described in detail below.

The LED module 11 includes a substrate 11a and an LED 11b, and the LED 11b is placed on the substrate 11a as shown in FIG. 1B, for example.

The conditions for mounting the LED 11b on the substrate 11a is not particularly limited, and can be appropriately set according to the desired optical properties. FIGS. 1A and 1B show an example in which 4×9=36 matrixes are two, i.e., seventy-two LEDs 11b are mounted on the substrate 11a.

The shape of the LED 11b is not particularly limited, and is generally a square shape or a rectangular shape. The size of the LED 11b is not particularly limited, and in the case of a square, the length of one side is, for example, 1.8 to 2.2 mm, 3 to 3.5 mm, or 4 to 5.3 mm, and in the case of a rectangle, the length of the short side is, for example, the same as the length of the square, and the ratio of the short side to the long side is, for example, 1:1 to 3. On the surface of the substrate 11a to which the LEDs 11b are mounted, the width between the adjacent LEDs is, for example, 0.2 to 0.5 mm.

In the LED flash light source 10 of the present embodiment, the lens member 13 is attached to the hollow portion in the frame of the frame-shaped attaching plate 12. Examples of the material of the frame-shaped attaching plate 12 include stainless steel, aluminum, and titanium. The thickness of the frame-shaped attaching plate 12 is, for example, 0.2 to 2 mm or 0.3 mm.

The lens member 13 may be a lens member that allows the emission surface of flash emitted from the LED 11b to have a uniform illuminance distribution. Examples of the lens member 13 include a fly-eye lens and an integrator lens. For example, as shown in FIG. 1B, by dividing the lens member 13 into two or more pieces so as not to become too large, the burden on the lens member 13 can be further reduced and damage can be prevented. It is preferable that the lens member 13 be not too small so as not to cause loss in extraction of the emitted flash.

The shock-absorbing sheet includes a lower shock-absorbing sheet 14a and an upper shock-absorbing sheet 14b. The lower shock-absorbing sheet 14a is placed on the LED module 11, the frame-shaped attaching plate 12 to which the lens member 13 is attached is placed on the lower shock-absorbing sheet 14a, and the upper shock-absorbing sheet 14b is placed on the frame-shaped attaching plate 12. The lower shock-absorbing sheet 14a and the upper shock-absorbing sheet 14b are each in the shape of the frame, for example. The thickness of the lower shock-absorbing sheet 14a is, for example, 0.2 mm to 3 mm, and the thickness of the upper shock-absorbing sheet 14b is, for example, 0.2 mm to 3 mm. As the lower shock-absorbing sheet 14a and the upper shock-absorbing sheet 14b, general shock-absorbing sheets may be used. According to the LED flash light source 10 of the present embodiment, by placing the shock-absorbing sheet on the upper and lower sides of the frame-shaped attaching plate 12 to which the lens member 13 is attached, respectively, the vibration of the frame-shaped attaching plate 12 due to the impact caused by being stepped by the tire of the aircraft can be suppressed. As a result, it is possible to prevent damage due to ejection or the like of the lens member 13. As described above, the LED flash light source 10 of the present embodiment is excellent in impact resistance.

For example, as shown in FIGS. 1A and 1B, the LED flash light source 10 of the present embodiment may further include the frame-shaped holding plate 15, the frame-shaped holding plate 15 may be placed on the upper shock-absorbing sheet 14b, and the frame-shaped attaching plate 12 may be fixed to the LED module 11 by the frame-shaped holding plate 15. Examples of the material of the frame-shaped holding plate 15 include stainless steel, aluminum, and titanium. The thickness of the frame-shaped holding plate 15 is, for example, 0.2 to 3 mm or 0.8 mm. The frame-shaped holding plate 15 is fixed to the LED module 11 by using screws, for example.

The LED flash light source 10 of the present embodiment may further include a heat radiating member. The heat radiating member will be described in detail in the second example embodiment.

The LED flash light source 10 of the present embodiment is lighter than a xenon flash light source for a runway-embedded flash lighting device. Thus, according to the present example embodiment, it is possible to provide a light flash light source for a runway-embedded flash lighting device.

While the lifetime of a xenon flash light source for a runway-embedded flash lighting device is about 500 hours, the LED flash light source 10 for a runway-embedded flash lighting device of the present example embodiment can be used indefinitely, for example. Thus, according to the present example embodiment, it is possible to provide a flash light source for a runway-embedded flash lighting device having a long life.

While the effective luminous intensity of a xenon flash light source for a runway-embedded flash lighting device is 1000 cd or more, specifically about 1200 cd, the effective luminous intensity of the LED flash light source 10 for a runway-embedded flash lighting device of the present example embodiment is, for example, 6000 cd or more, specifically about 7000 cd. Thus, according to the present example embodiment, it is possible to provide a flash light source for a runway-embedded flash lighting device having a high effective luminous intensity.

While a xenon flash light source for a runway-embedded flash lighting device cannot switch the luminous intensity among high luminous intensity, medium luminous intensity, and low luminous intensity, since the LED flash light source 10 for a runway-embedded flash lighting device of the present example embodiment has high effective luminous intensity as described above, it can switch the luminous intensity among high luminous intensity (e.g., 6000 cd or more), medium luminous intensity (e.g., 1000 cd or more), and low luminous intensity (e.g., 250 cd or more), for example. Thus, according to the present example embodiment, it is possible to provide a flash light source for a runway-embedded flash lighting device that can switch the luminous intensity. The high luminous intensity is used, for example, in the daytime of poor visibility due to fog, rain, or the like, the low luminous intensity is used, for example, in the night, and the medium luminous intensity is used, for example, in the evening.

While the power dissipation of a flash lighting device using a xenon flash light source is about 500 W, the power dissipation of the LED flash light source 10 for a runway-embedded flash lighting device of the present example embodiment is, for example, about 80 W (up to 114 W at high luminous intensity, 31 W at medium luminous intensity, 24 W at low luminous intensity). Thus, according to the present example embodiment, it is possible to provide a flash light source for a runway-embedded flash lighting device that is low in power dissipation.

Second Example Embodiment

Figure 2:
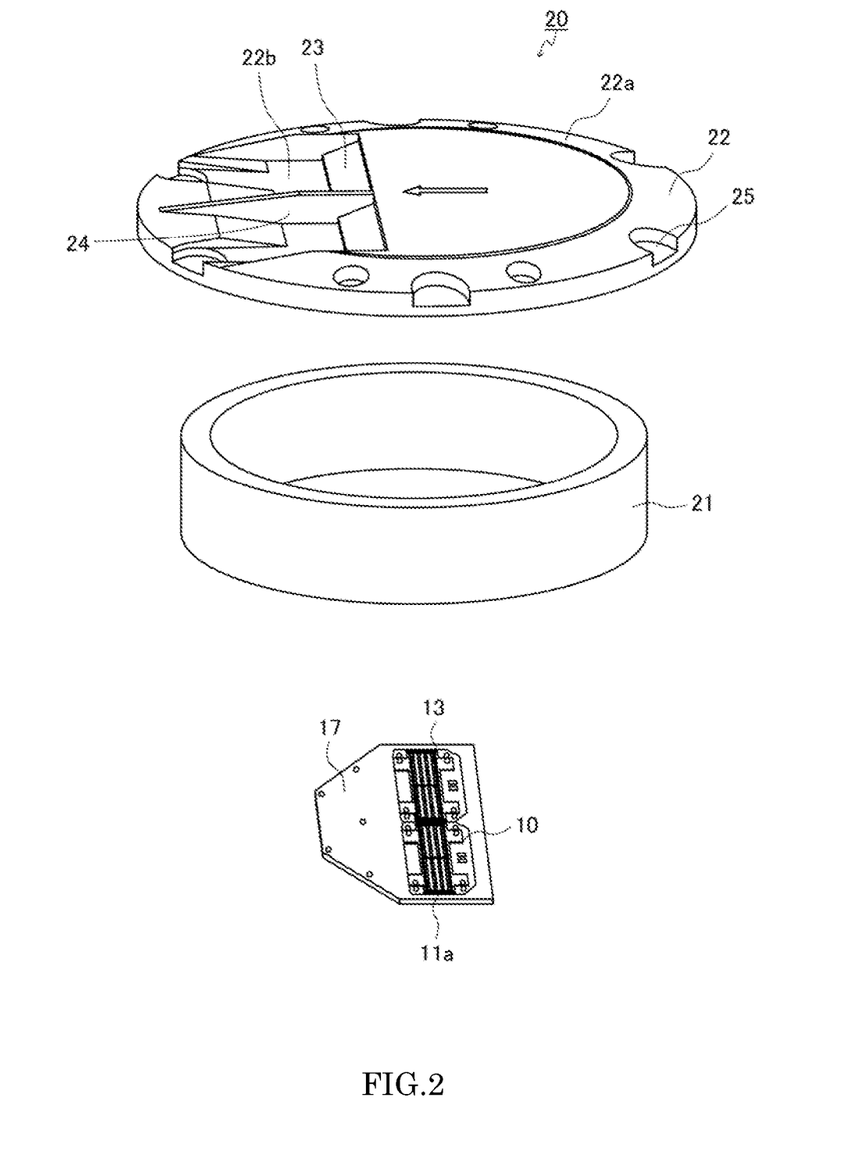
FIG. 2 is an exploded perspective view showing the configuration of an example of the runway-embedded flash lighting device according to the second example embodiment.

FIG. 2 is an exploded perspective view showing the configuration of an example of the runway-embedded flash lighting device according to the present example embodiment. As shown in FIG. 2, a runway-embedded flash lighting device 20 includes a cylindrical body 21, a ceiling member 22, a light guide member 23, and an LED flash light source 10.

The cylindrical body 21 can be embedded in a runway 30 as will be described below with reference to FIG. 9 in the fourth example embodiment. The cylindrical body 21 may be, for example, a circular cylinder as shown in FIG. 2, or may be a cylinder other than a circular cylinder such as an elliptical cylinder or a polygonal cylinder.

The ceiling member 22 is placed in the upper opening of the cylindrical body 21 in a state of being able to be exposed to the runway surface when the cylindrical body 21 is embedded in the runway 30.

Figure 3:
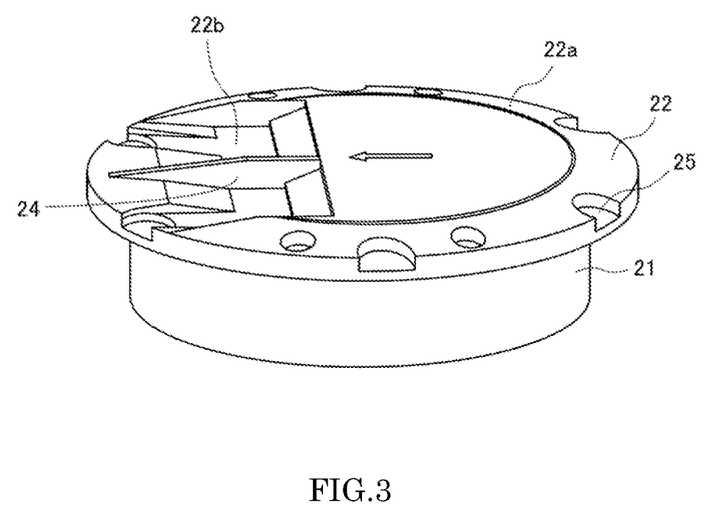
FIG. 3 is a perspective view from above showing an example of the cylindrical body and ceiling member in the runway-embedded flash lighting device according to the second example embodiment.

The cylindrical body 21 and the ceiling member 22 may be separate members as shown in FIG. 2, or may be integrally molded as an integrally molded product as shown in FIG. 3. Examples of the integrally molded product include aluminum castings, titanium castings, aluminum alloy castings, and titanium alloy castings. Among them, aluminum castings and titanium castings are preferable because they are light, and aluminum castings are particularly preferable because they are inexpensive. When the cylindrical body 21 and the ceiling member 22 are separate members, as in the case of the integrated molding product, the cylindrical body 21 and ceiling member 22 may be, for example, aluminum castings, titanium castings, aluminum alloy castings, or titanium alloy castings.

The ceiling member 22 is provided with a flash emission window, and the light guide member 23 is placed in the flash emission window. The runway-embedded flash lighting device 20 of the present example embodiment may include two or more flash emission windows, and the light guide member 23 may be placed in each of the flash emission windows, for example. If two or more light guide members 23 are used, the burden on the light guide member 23 can be further reduced and damage can be prevented. For example, as shown in FIG. 2, the flash emission window and the light guide member 23 may be divided into two or more by a reinforcing plate member 24 to be described below. The light guide member 23 may be, for example, a prism lens or the like. The material of the prism lens is not particularly limited, and may be, for example, glass or the like.

The ceiling member 22 may have a stepped structure that includes an upper ceiling portion 22a and a lower ceiling portion 22b, wherein the upper ceiling portion 22a is placed on the rear side relative to the emission direction of the flash emission window, and the lower ceiling portion 22b is placed on the emission direction side of the flash emission window, for example.

The runway-embedded flash lighting device 20 of the present example embodiment may further include the reinforcing plate member 24, and the reinforcing plate member 24 may be placed on the outer surface of the lower ceiling portion 22b in a state of standing upright in the vertical direction of the outer surface of the lower ceiling portion 22b, for example. The ceiling member 22 and the reinforcing plate member 24 may be separate members or may be integrally molded as an integrally molded product, for example. When the ceiling member 22 and the reinforcing plate member 24 are separate members, as in the case of the integrated molding product, the reinforcing plate member 24 may be, for example, aluminum castings, titanium castings, aluminum alloy castings, or titanium alloy castings.

The runway-embedded flash lighting device 20 of the present example embodiment may further include a fixing member 25, the fixing member 25 may be placed on the outer peripheral side of the ceiling member 22, and the fixing member 25 may be provided with a screw hole to be inserted with a screw for fixing to the runway 30, for example. The fixing member 25 may have a tapered shape in which the outer surface is inclined so as to be thinner toward the outer periphery, for example. The ceiling member 22 and the fixing member 25 may be, for example, separate members or may be integrally molded as an integrally molded product. When the ceiling member 22 and the fixing member 25 are separate members, as in the case of the integrated molding product, the fixing member 25 may be, for example, aluminum castings, titanium castings, aluminum alloy castings, or titanium alloy castings. At least one of the ceiling member 22 and the fixing member 25 may have a hole through which the runway-embedded flash lighting device 20 is pulled up by a tool.

Figure 4:
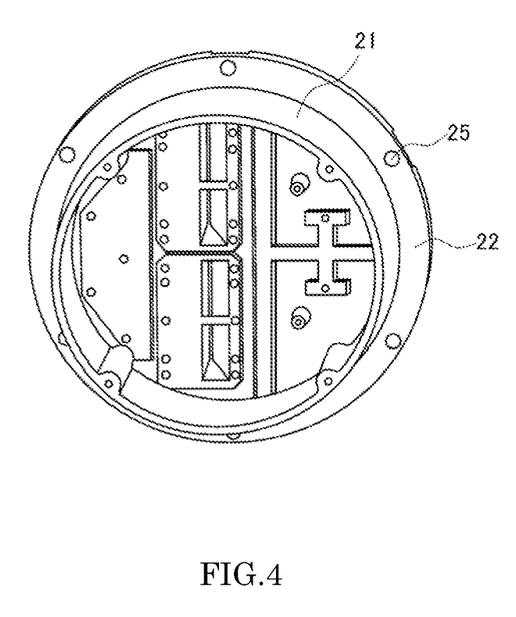
FIG. 4 is a perspective view from below showing an example of the cylindrical body and ceiling member in the runway-embedded flash lighting device according to the second example embodiment.

The LED flash light source 10 is placed inside the cylindrical body 21 in a state of capable of emitting flash toward the light guide member 23 placed in the flash emission window. FIG. 4 is a perspective view from below showing an example of the cylindrical body 21 and ceiling member 22. For example, as shown in FIG. 4, the inner surface of the ceiling member 22 (the surface on the cylindrical body 21 side) may be provided with a site to be placed with the LED flash light source 10 below the flash emission window. The light guide member 23 allows flash emitted from the LED flash light source 10 to be emitted to the outside from the flash emission window.

The LED flash light source 10 is an LED flash light source 10 of the first embodiment.

The LED flash light source 10 may further include a heat radiating member 17 as shown in FIG. 2, and the heat radiating member 17 may be attached to the LED module 11, for example.

The heat radiating member 17 is placed inside the cylindrical body 21, wherein a part of the heat radiating member 17 is in contact with the LED module 11 and at least a part of the rest of the heat radiating member 17 is in contact with the ceiling member 22. Thus, the heat generated by the LED module 11 can be transmitted to the ceiling member 22 through the heat radiating member 17 to radiate heat to the outside of the device 20. The runway-embedded flash lighting device 20 of the present example embodiment is excellent in heat dissipation as compared to the case of radiating heat inside the device 20.

The heat radiating member 17 is partially in contact with the surface of the substrate 11a opposite to the LED 11b mounting side, for example, as shown in FIG. 2. At least a part of the rest of the heat radiating member 17 may be in contact with the ceiling member 22, and can be in contact with any part of the ceiling member 22. For example, as shown in FIG. 2, at least a part of the rest of the heat radiating member 17 may be in contact with the ceiling member 22 on the flash emission side relative to the flash emission window. In this aspect, for example, at least a part of the rest of the heat radiating member 17 may be in contact with the lower ceiling portion 22b. In the aspect shown in FIG. 2, the heat generated by the LED module 11 can be transmitted to the flash emission side relative to the flash emission window through the heat radiating member 17, and it is possible to melt the accumulated snow that blocks the flash emission in an airfield runway in a cold region, for example. For example, as shown in FIG. 4, the inner surface of the ceiling member 22 (the surface on the cylindrical body 21 side) may be provided with a site to be placed with the heat radiating member 17 in addition to the site to be placed with the LED flash light source 10.

Figure 5:
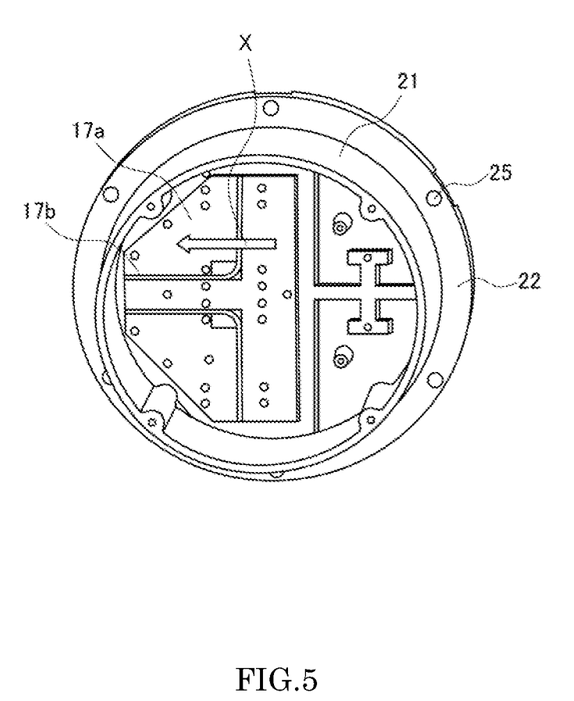
FIG. 5 is a perspective view from below showing an example of the cylindrical body, ceiling member, and heat conducting member in the runway-embedded flash lighting device according to the second example embodiment.

The heat radiating member 17 may include a heat conducting member, for example. Examples of the heat conducting member include a plate-like heat sink and a heat pipe, and a self-made heat conducting member or a commercially available heat conducting member may be used. Examples of the material of the plate-like heat sink include copper and aluminum. The material of the heat pipe is not particularly limited and may be a known heat conductive material, and a specific example of the material is metal or the like. Examples of the metal include aluminum and its alloys, magnesium and its alloys, iron and its alloys, copper and its alloys, titanium and its alloys, molybdenum and its alloys, and tungsten and its alloys. FIG. 5 is a perspective view from below showing an example of the cylindrical body, ceiling member, and heat conducting member in the runway-embedded flash lighting device of the present example embodiment. The heat conducting member may include the plate-like heat sink 17a and the heat pipe 17b, a part of one surface of the plate-like heat sink 17a may be in contact with the LED module 11, at least a part of the rest of the one surface of the plate-like heat sink 17a may be in contact with the lower ceiling portion 22b, and the heat pipe 17b may be attached to the plate-like heat sink 17a in a state where one end side of which is located on the LED module 11 side and the other end side is located on the lower ceiling portion 22b side, for example. While FIG. 5 shows an example in which the heat pipe 17b is attached to the other surface of the plate-like heat sink 17a (the surface opposite to the surface (one surface) in contact with the LED module 11), the heat pipe 17b may be attached to one surface of the plate-like heat sink 17a or may be attached to both of one surface and the other surface of the plate-like heat sink 17a. In the aspect shown in FIG. 5, the heat pipe 17b may be placed by, for example, soldering or the like in such a manner by notching the plate-like heat sink 17a in the thickness direction and embedding it therein.

The heat pipe 17b may have a first straight portion extending in a direction perpendicular to the emission direction (arrow X direction) and a second straight portion extending in the emission direction, wherein the first straight portion and the second straight portion may be coupled to form an L-shape as a whole, the one end side may have the first straight portion, and the other end side may have the second straight portion, for example, as shown in FIG. 5.

While FIG. 5 shows an example in which the heat radiating member 17 is a heat conducting member, it is also possible to radiate heat using a heat radiating fin placed on the surface of the substrate 11a on the surface opposite to the LED 11b mounting side or a fan or the like that blows air toward the substrate 11a.

Figure 10:
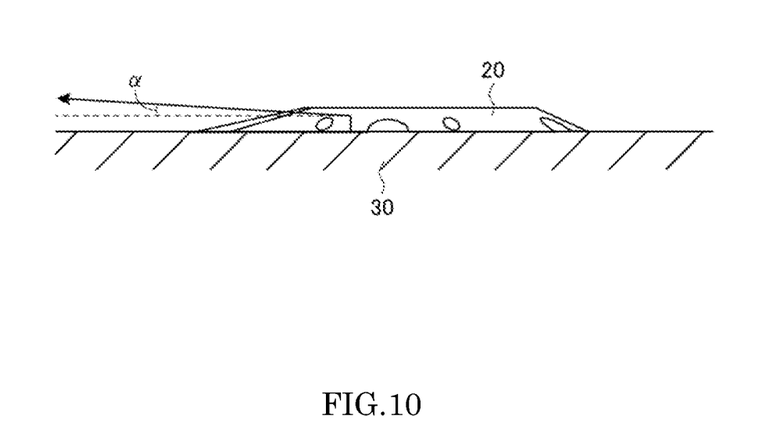
FIG. 10 is a schematic side view explaining flash emission in the runway-embedded flash lighting device according to the second example embodiment.
Figure 11:
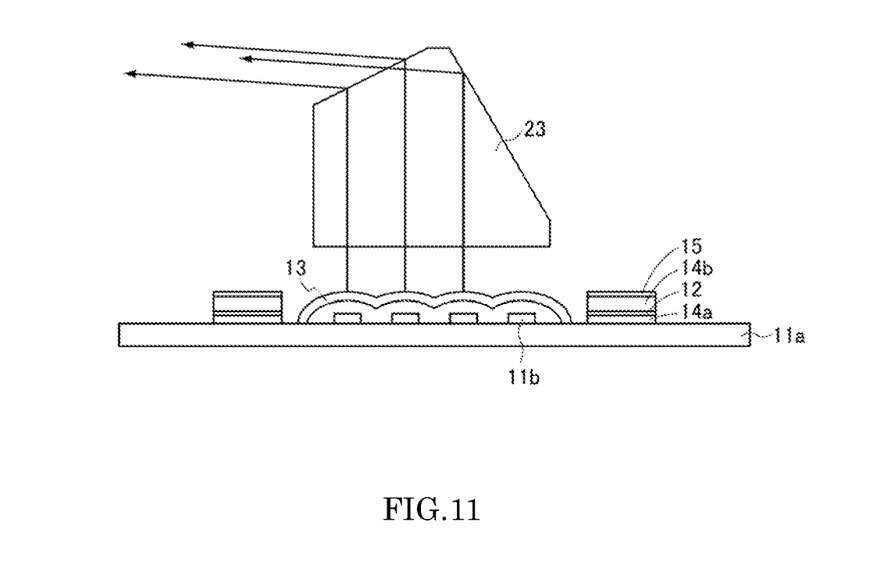
FIG. 11 is a side view showing an example of the light guide member and LED flash light source inside the runway-embedded flash lighting device shown in FIG. 10.

It is preferable that an upward flash having an angle α of about 3 degrees with respect to a direction parallel to the runway surface be emitted from the runway-embedded flash lighting device 20 of the present example embodiment, for example, as shown in FIG. 10. The light guide member 23 and the LED flash light source 10 inside the runway-embedded flash lighting device 20 shown in FIG. 10 can be shown as in FIG. 11. In FIG. 11, as in FIG. 1B, the lower shock-absorbing sheet 14a, the frame-shaped attaching plate 12, the upper shock-absorbing sheet 14b, and, the hollow portion in the frame of the frame-shaped holding plate 15 are shown perspectively.

While the weight of a flash lighting device using a xenon flash light source is 65 kg or less, specifically, about 40 kg, the weight of the runway-embedded flash lighting device 20 of the present example embodiment is, for example, 18 kg or less, specifically, about 11 kg. Thus, according to the present example embodiment, it is possible to provide a light runway-embedded flash lighting device.

Third Example Embodiment

Figure 6:
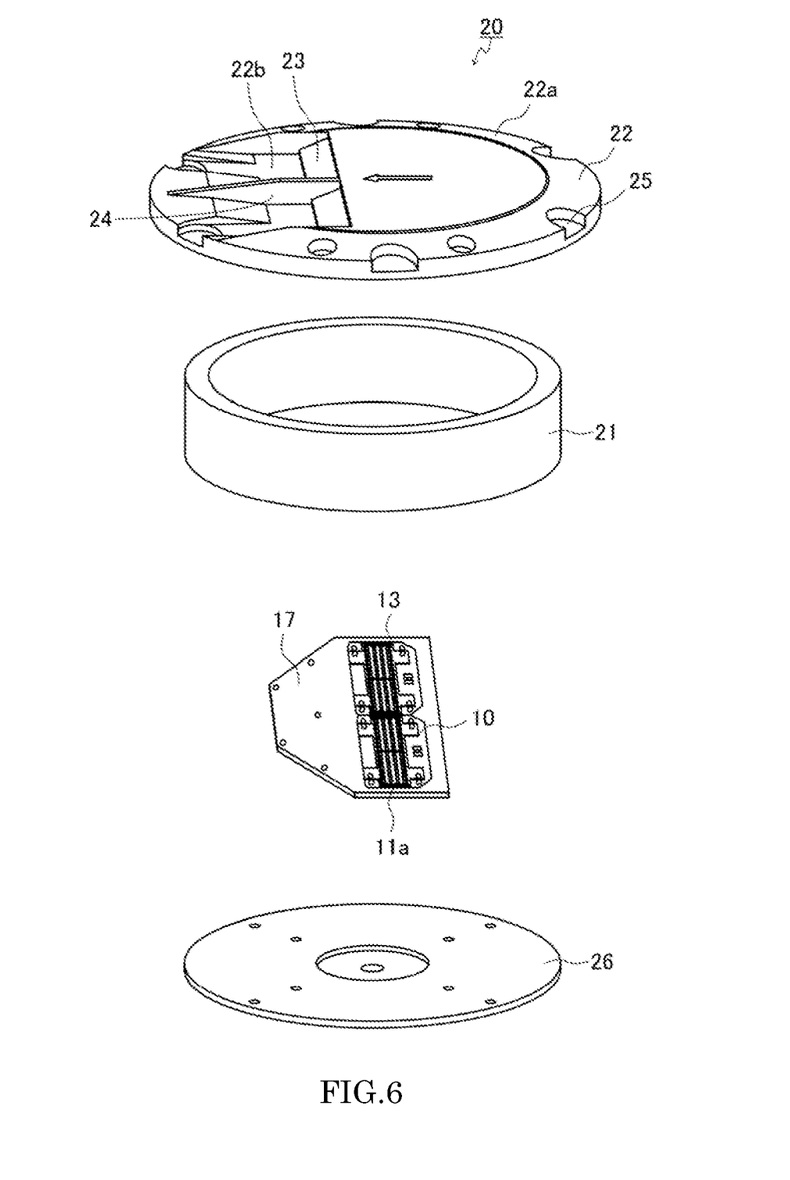
FIG. 6 is an exploded perspective view showing the configuration of an example of the runway-embedded flash lighting device according to the third example embodiment.
Figure 7:
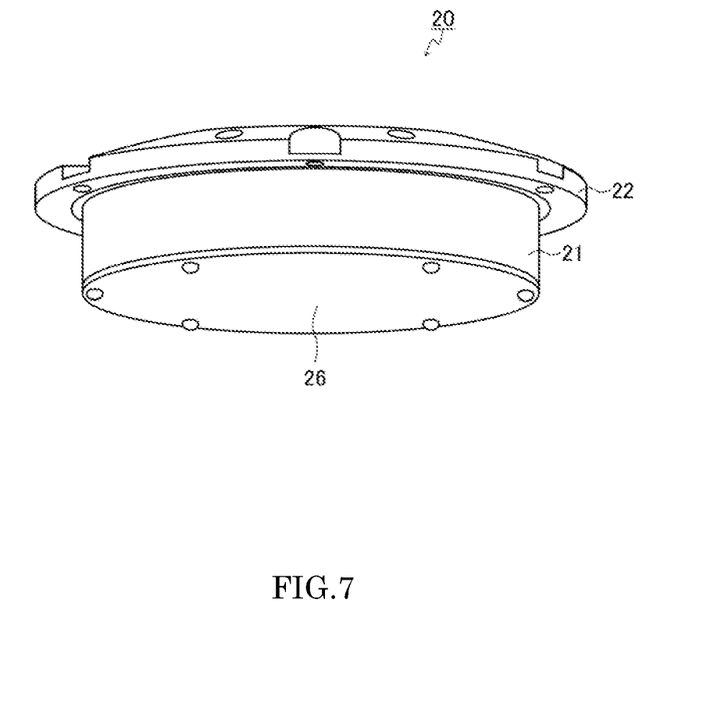
FIG. 7 is a perspective view from below showing the runway-embedded flash lighting device shown in FIG. 6.

FIG. 6 is an exploded perspective view showing the configuration of an example of the runway-embedded flash lighting device of the present example embodiment. FIG. 7 is a perspective view from below showing the runway-embedded flash lighting device shown in FIG. 6. As shown in FIGS. 6 and 7, the runway-embedded flash lighting device 20 of the present example embodiment is the same as the runway-embedded flash lighting device 20 of the second example embodiment except that it includes a bottom cover member 26.

The bottom cover member 26 is placed in a state of closing the lower opening of the cylindrical body 21. Examples of the material of the bottom cover member 26 include aluminum, titanium, aluminum alloy, titanium alloy, and castings thereof.

Figure 8:
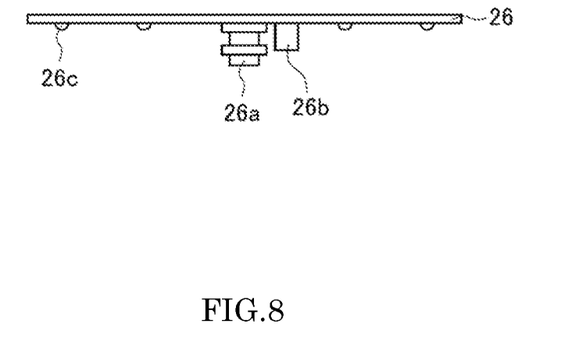
FIG. 8 is a side view showing an example of the bottom cover member of the runway-embedded flash lighting device according to the third example embodiment.

FIG. 8 is a side view showing an example of the bottom cover member 26. For example, as shown in FIG. 8, the bottom cover member 26 may include a cable gland 26a and an external ground terminal 26b. Further, when the bottom cover member 26 is attached to at least one of the cylindrical body 21 and the LED flash light source 10 with a screw 26c and an O-ring (not shown), for example, the runway-embedded flash lighting device 20 can be waterproof.

Fourth Example Embodiment

Figure 9:
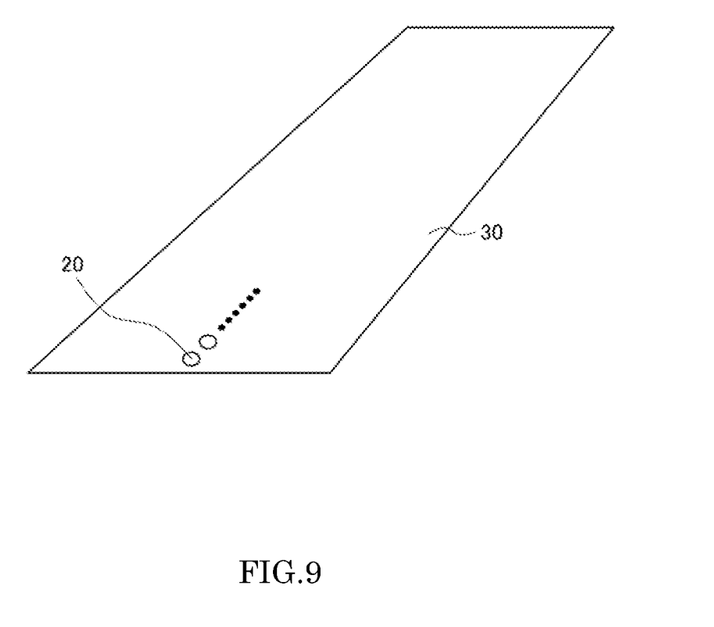
FIG. 9 is a schematic perspective view showing the configuration of an example of the runway according to the fourth example embodiment.

FIG. 9 is a schematic perspective view showing the configuration of an example of the runway of the present example embodiment. While the runway is shown schematically simplified in FIG. 9, the runway 30 is one in which the runway-embedded flash lighting device 20 of the second or third example embodiment is embedded with the ceiling member 22 exposed.

While the present invention has been described above with reference to illustrative example embodiments, the present invention is by no means limited thereto. Various changes and variations that may become apparent to those skilled in the art may be made in the configuration and specifics of the present invention without departing from the scope of the present invention.

Supplementary Notes

A part of or the whole of the above-described example embodiments can be described as the following supplementary notes. However, the present invention is by no means limited thereto.

(Supplementary Note 1)
An LED flash light source for a runway-embedded flash lighting device including:
  an LED module;
  a frame-shaped attaching plate;
  a lens member; and
  a shock-absorbing sheet, wherein
  the lens member is attached to a hollow portion in s frame of the frame-shaped attaching plate,
  the lens member is a lens member that allows an emission surface of flash emitted from the LED module to have a uniform illuminance distribution,
  the shock-absorbing sheet includes:
    a lower shock-absorbing sheet; and
    an upper shock-absorbing sheet,
  the lower shock-absorbing sheet is placed on the LED module,
  the frame-shaped attaching plate to which the lens member is attached is placed on the lower shock-absorbing sheet, and
  the upper shock-absorbing sheet is placed on the frame-shaped attaching plate.

(Supplementary Note 2)
The LED flash light source for a runway-embedded flash lighting device according to Supplementary Note 1, further including:
  a frame-shaped holding plate, wherein
  the frame-shaped holding plate is placed on the upper shock-absorbing sheet, and
  the frame-shaped attaching plate is fixed to the LED module by the frame-shaped holding plate.

(Supplementary Note 3)
The LED flash light source for a runway-embedded flash lighting device according to Supplementary Note 1 or 2, further including:
  a heat radiating member, wherein
  the heat radiating member is attached to the LED module.

(Supplementary Note 4)
The LED flash light source for a runway-embedded flash lighting device according to Supplementary Note 3, wherein
  the heat radiating member includes a heat conducting member.

(Supplementary Note 5)
The LED flash light source for a runway-embedded flash lighting device according to Supplementary Note 4, wherein
  the heat conducting member includes at least one of a plate-like heat sink or a heat pipe.

(Supplementary Note 6)
A runway-embedded flash lighting device including:
  a cylindrical body;
  a ceiling member;
  a light guide member; and
  an LED flash light source, wherein
  the cylindrical body can be embedded in a runway,
  the ceiling member is placed in an upper opening of the cylindrical body in a state of being able to be exposed to a runway surface when the cylindrical body is embedded in the runway,
  the ceiling member is provided with a flash emission window,
  the light guide member is placed in the flash emission window,
  the LED flash light source is placed inside the cylindrical body in a state of capable of emitting flash toward the light guide member placed in the flash emission window,
  the light guide member allows flash emitted from the LED flash light source to be emitted to an outside from the flash emission window, and
  the LED flash light source is the LED flash light source according to any one of Supplementary Notes 1 to 5.

(Supplementary Note 7)
The runway-embedded flash lighting device according to Supplementary Note 6, wherein
  the ceiling member includes an upper ceiling portion and a lower ceiling portion,
  the upper ceiling portion is placed on a rear side relative to an emission direction of the flash emission window, and
  the lower ceiling portion is placed on an emission direction side of the flash emission window.

(Supplementary Note 8)
The runway-embedded flash lighting device according to Supplementary Note 7, further including:
  a reinforcing plate member, wherein
  the reinforcing plate member is placed on an outer surface of the lower ceiling portion in a state of standing upright in a vertical direction of the outer surface of the lower ceiling portion.

(Supplementary Note 9)
The runway-embedded flash lighting device according to any one of Supplementary Notes 6 to 8, including:
  two or more flash emission windows, wherein
  the light guide member is placed in each of the flash emission windows.

(Supplementary Note 10)
The runway-embedded flash lighting device according to any one of Supplementary Notes 6 to 9, further including:
  a fixing member, wherein
  the fixing member is placed on an outer peripheral portion of the ceiling member, and
  the fixing member is provided with a screw hole to be inserted with a screw for fixing to the runway.

(Supplementary Note 11)
The runway-embedded flash lighting device according to Supplementary Note 10, wherein
  the ceiling member and the fixing member are integrally molded as an integrally molded product.

(Supplementary Note 12)
The runway-embedded flash lighting device according to any one of Supplementary Notes 6 to 11, further including:
  a bottom cover member, wherein
  the bottom cover member is placed in a state of closing a lower opening of the cylindrical body.

(Supplementary Note 13)
The runway-embedded flash lighting device according to Supplementary Note 12, wherein
  the bottom cover member includes a cable gland and an external ground terminal.

(Supplementary Note 14)
The runway-embedded flash lighting device according to any one of Supplementary Notes 6 to 13, wherein
  the cylindrical body and the ceiling member are integrally molded as an integrally molded product.

(Supplementary Note 15)
A runway with the runway-embedded flash lighting device according to any one of Supplementary Notes 6 to 14.

This application claims priority from Japanese Patent Application No. 2018-201401 filed on Oct. 26, 2018. The entire subject matter of the Japanese Patent Application is incorporated herein by reference.

Industrial Applicability

The present invention can provide a new LED flash light source for a runway-embedded flash lighting device that is light, has a long life, has high effective luminous intensity, can switch the luminous intensity, is low in power dissipation, and is excellent in impact resistance.

REFERENCE SIGNS LIST

10: LED flash light source
11: LED module
11a: substrate
11b: LED
12: frame-shaped attaching plate
13: lens member
14a: lower shock-absorbing sheet
14b: upper shock-absorbing sheet
15: frame-shaped holding plate
17: heat radiating member
17a: plate-like heat sink
17b: heat pipe
20: runway-embedded flash lighting device
21: cylindrical body
22: ceiling member
22a: upper ceiling portion
22b: lower ceiling portion
23: light guide member
24: reinforcing plate member
25: fixing member
26: bottom cover member
26a: cable gland
26b: external ground terminal
26c: screw
30: runway

The invention claimed is:

1. A runway-embedded flash lighting device comprising:
a body;
a ceiling member;
a bottom cover member;
a light guide member; and
an LED flash light source, wherein
the body is configured to be embedded in a runway,
the ceiling member is disposed in an upper opening of the body and configured to be exposed to a runway surface when the body is embedded in the runway,
the ceiling member comprises a flash emission window,
the bottom cover member is disposed on and covering a lower opening of the body,
the light guide member is disposed in the flash emission window,
two or more flash emission windows, and
the light guide member is disposed in each of the flash emission window,
the LED flash light source is disposed inside the body and configured to emit a flash toward the light guide member, and
the inner surface of the ceiling member is provided with a site to be disposed with the LED flash light source below the flash emission window,
the light guide member is configured to allow the flash emitted from the LED flash light source to be emitted from the flash emission window to outside the runway-embedded flash lighting device, and
the LED flash light source comprises:
an LED module;
a frame-shaped attaching plate; and
a lens member, wherein
the lens member is attached to a hollow portion in a frame of the frame-shaped attaching plate,
the lens member is configured to allow an emission surface of the flash emitted from the LED module to have a uniform illuminance distribution.

2. The LED flash light source for a runway-embedded flash lighting device according to claim 1, further comprising:
the shock-absorbing sheet comprises:
a lower shock-absorbing sheet; and
an upper shock-absorbing sheet,
the lower shock-absorbing sheet is disposed on the LED module,
the frame-shaped attaching plate to which the lens member is attached is disposed on the lower shock-absorbing sheet, and
the upper shock-absorbing sheet is disposed on the frame-shaped attaching plate.

3. The LED flash light source for a runway-embedded flash lighting device according to claim 1, further comprising:
a frame-shaped holding plate, wherein
the frame-shaped holding plate is placed on the upper shock-absorbing sheet, and
the frame-shaped attaching plate is fixed to the LED module by the frame-shaped holding plate.

4. The LED flash light source for a runway-embedded flash lighting device according to claim 1, further comprising:
a heat radiating member, wherein
the heat radiating member is attached to the LED module, and,
the heat radiating member comprises a heat conducting member.

5. The runway-embedded flash lighting device according to claim 1, wherein
the ceiling member comprises an upper ceiling portion and a lower ceiling portion,
the upper ceiling portion is disposed on a rear side relative to an emission direction of the flash emission window, and
the lower ceiling portion is disposed on an emission direction side of the flash emission window.

6. The runway-embedded flash lighting device according to claim 1, further comprising:
a reinforcing plate member, wherein
the reinforcing plate member is disposed on an outer surface of the lower ceiling portion of the ceiling member in a state of standing upright in a vertical direction with respect to the outer surface of the lower ceiling portion.

7. The runway-embedded flash lighting device according to claim 1, wherein a flash light source is able to switch the luminous intensity among high luminous intensity, medium luminous intensity, and low luminous intensity.

8. The LED flash light source for a runway-embedded flash lighting device according to claim 1, further comprising:
the bottom cover member includes a cable gland and an external ground terminal, and
the bottom cover member is attached to at least one of the cylindrical body and the LED flash light source with a fastener and an O-ring for the runway-embedded flash lighting device is waterproof.

9. The runway-embedded flash lighting device according to claim 1, wherein the body is cylindrical in shape.

10. The LED flash light source for a runway-embedded flash lighting device according to claim 2, further comprising:

a heat radiating member, wherein
the heat radiating member is attached to the LED module, and,
the heat radiating member comprises a heat conducting member.

* * * * *